April 24, 1928.

P. R. SIMMONS 1,667,498

MACHINE FOR MANUFACTURING PAPER CUPS

Filed Dec. 12, 1924    8 Sheets-Sheet 1

INVENTOR.
PAUL R. SIMMONS.

BY

ATTORNEYS.

FIG. 3
FIG. 4

INVENTOR.
PAUL R. SIMMONS.
BY
ATTORNEYS.

April 24, 1928.

P. R. SIMMONS 1,667,498

MACHINE FOR MANUFACTURING PAPER CUPS

Filed Dec. 12, 1924     8 Sheets-Sheet 5

INVENTOR.
PAUL R. SIMMONS.
BY
ATTORNEYS.

April 24, 1928.

P. R. SIMMONS

MACHINE FOR MANUFACTURING PAPER CUPS

Filed Dec. 12, 1924   8 Sheets-Sheet 6

INVENTOR.
PAUL R. SIMMONS.

BY

ATTORNEYS.

April 24, 1928.

P. R. SIMMONS 1,667,498

MACHINE FOR MANUFACTURING PAPER CUPS

Filed Dec. 12, 1924

INVENTOR.
PAUL R. SIMMONS.

BY

ATTORNEYS.

April 24, 1928. 1,667,498
P. R. SIMMONS
MACHINE FOR MANUFACTURING PAPER CUPS
Filed Dec. 12, 1924 8 Sheets-Sheet 8

INVENTOR.
PAUL R. SIMMONS.
BY
ATTORNEYS.

Patented Apr. 24, 1928.

1,667,498

UNITED STATES PATENT OFFICE.

PAUL R. SIMMONS, OF INDIANAPOLIS, INDIANA, ASSIGNOR TO PARAMOUNT PAPER PRODUCTS COMPANY, OF INDIANAPOLIS, INDIANA, A CORPORATION.

MACHINE FOR MANUFACTURING PAPER CUPS.

Application filed December 12, 1924. Serial No. 755,409.

The object of this machine is the manufacture of a novel form or construction of paper cups and the rapid manufacture thereof so as to reduce their cost. The cup referred to is substantially the same as that shown in my former application for a paper cup and process of making the same, Serial No. 694,787, filed February 23, 1924.

One feature of the invention is means to bend a sheet of paper around a core cylindrically so that the side edges will overlap and be secured together and with a margin extending beyond the end of the core, and means for folding in that extending margin and gluing it together when folded in order to form the bottom of the cup, and preferably to do the foregoing simultaneously. Another feature is to form a bead on the upper end of the cup, and also to do that simultaneously with the construction of the other parts of the cup. Said features of the machine include the idea of forming the bottom of the cup out of the material integral with the body of the cup, so that the entire cup is made from a single paper blank.

Another feature of the invention consists in forming the cup around a conical core including forming the body of the cup and top thereof, and to do this preferably simultaneously, and in addition to the foregoing, to provide means for automatically ejecting the cup from the core, and along with said ejecting means is the means for mounting the core so it will be angularly moved from the cup forming position to the cup ejecting position.

Another feature of the invention consists in forming a paper cup around a core by feeding a cup blank under the core, and providing hinged mold members under the paper blank over which the paper blank passes for folding it around the core.

Still another feature of the invention consists in providing means for forming two cups at the same time, and to that end, there is means for cutting out of a sheet of paper a plurality of cup blanks, the successive cup blanks being arranged opposite to each other so that the wide portion of one blank will follow the narrower portion of another blank, whereby a large portion of paper stock is saved.

Another feature of the invention consists in providing glue rolls adapted to apply glue only to one side edge of the blank and to the margin thereof intended to form the bottom of the cup.

Another feature of the invention consists in a movable bridge located over the glue rolls for conveying the blank from the glue applying position to the cup forming means. In connection with the foregoing is the arrangement of the movable bridge with fingers to engage the surface of the blank and said fingers being so arranged as not to engage the glued part thereof and to hold the blank so that the glued portion of the blank will not engage any part of the mechanism during its movement to the cup forming mechanism. Another feature of the invention consists in providing a cam shaft with intermediate driving means for causing the parts to operate in proper sequence and to give to the creasing and trimming rolls, the feed rolls and the glue rolls a substantially uniform speed.

The full nature of the invention will be understood from the accompanying drawings and the following description and claims:

The machine has a general frame construction including the bed 10 which is substantially horizontal and upon which the two side frames 11 and 12 are erected in and between which the parts of the mechanism are mounted. Near the rear end of the machine there is mounted on the bed plate uprights or stands 13 on the upper end of which there is secured the cross beam 14, as seen in Figs. 5 and 6.

Figure 3:
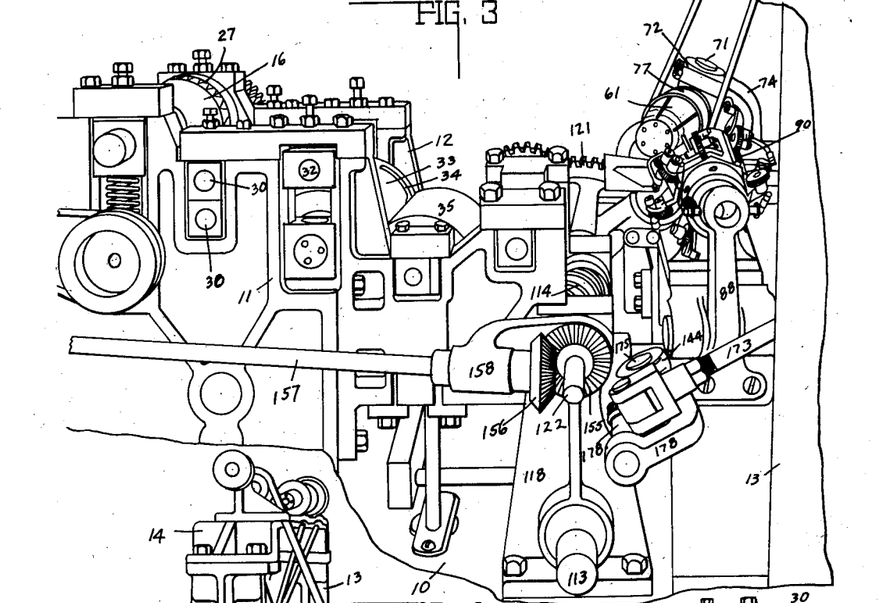
Fig. 3 is a view of the right hand side of the machine in perspective, parts being broken away.
Figure 4:
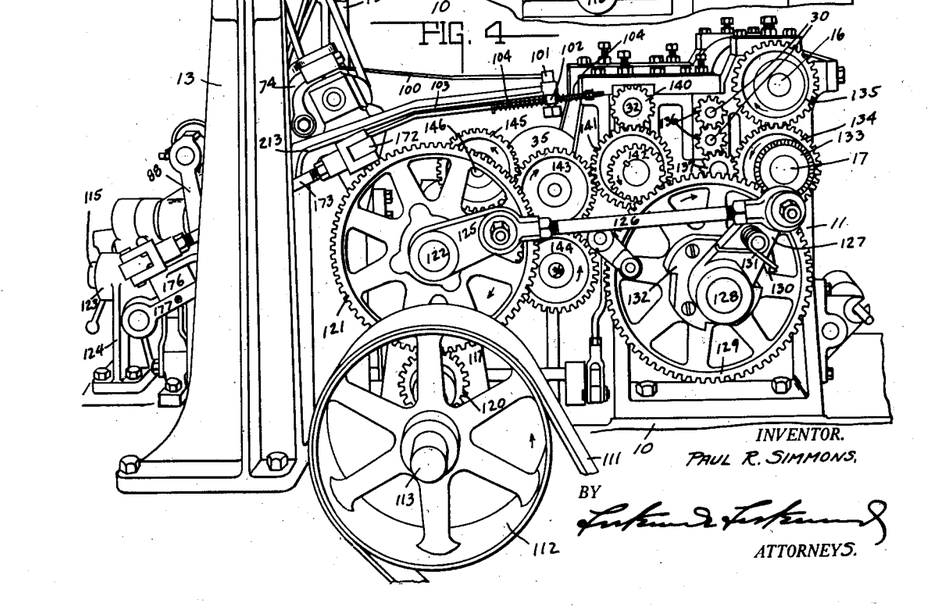
Fig. 4 is the elevation of the left hand side of the machine.
Figure 5:
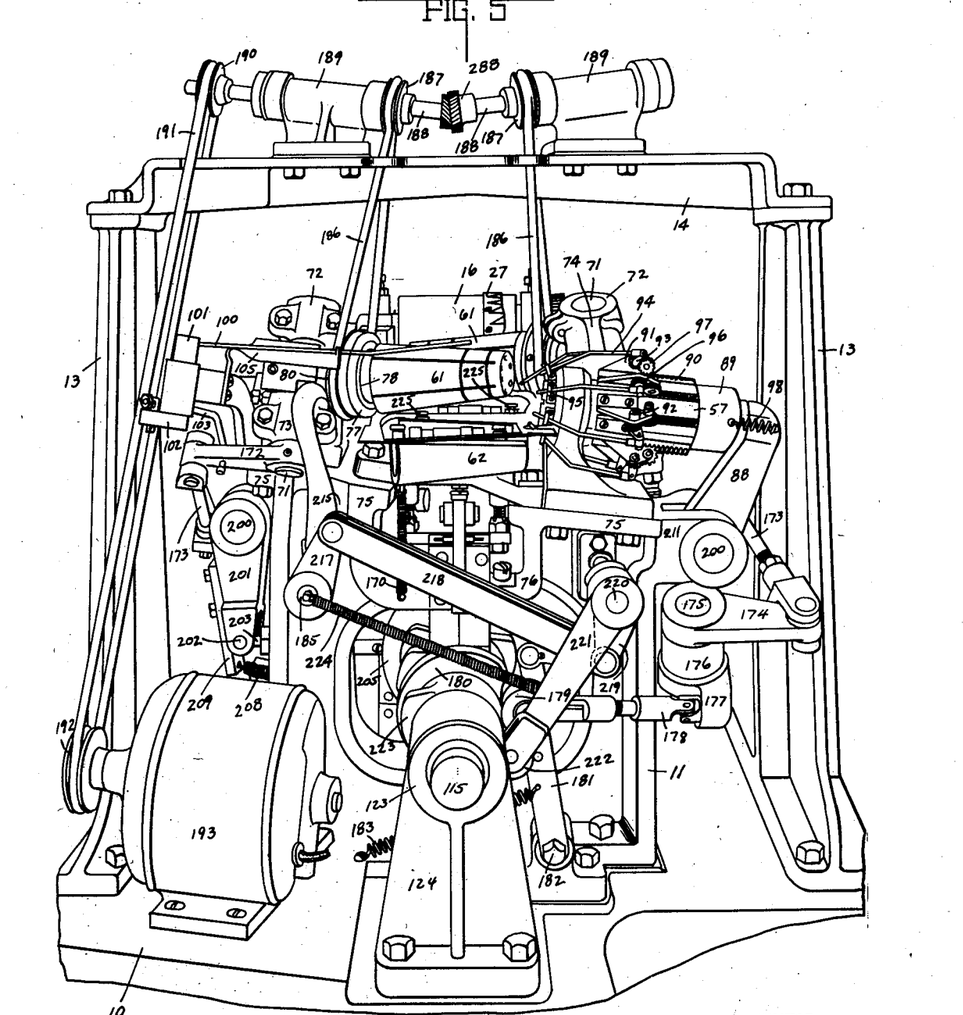
Fig. 5 is an elevation of the rear end of the machine in idle position.
Figure 6:
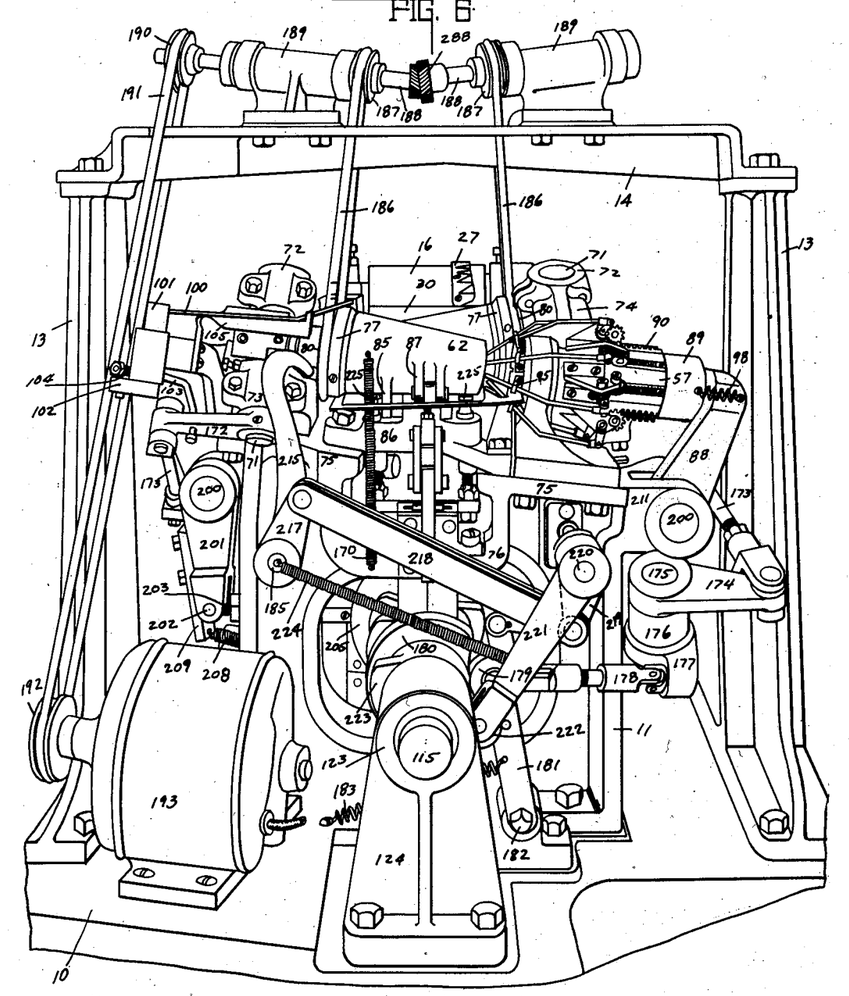
Fig. 6 is the same in position while the cups are being formed.

*Cup blank forming mechanism.*—The cup forming mechanism is mounted in the right hand portion of the machine, as seen in Fig. 3, or left hand portion, as seen in Fig. 4, and the parts shown in Figs. 5 and 6 which is the rear end of the machine. The forward portion of the machine consists of means for feeding, creasing, trimming and gluing the paper blanks which are fed to the cup forming end of the machine for making the cups.

Figure 1:
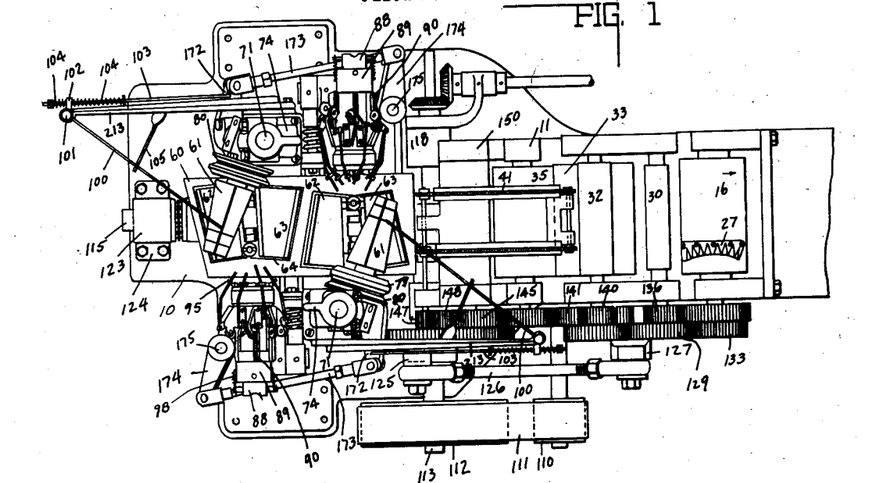
Figure 1 is a plan view of the machine in idle position, parts being broken away.
Figure 2:
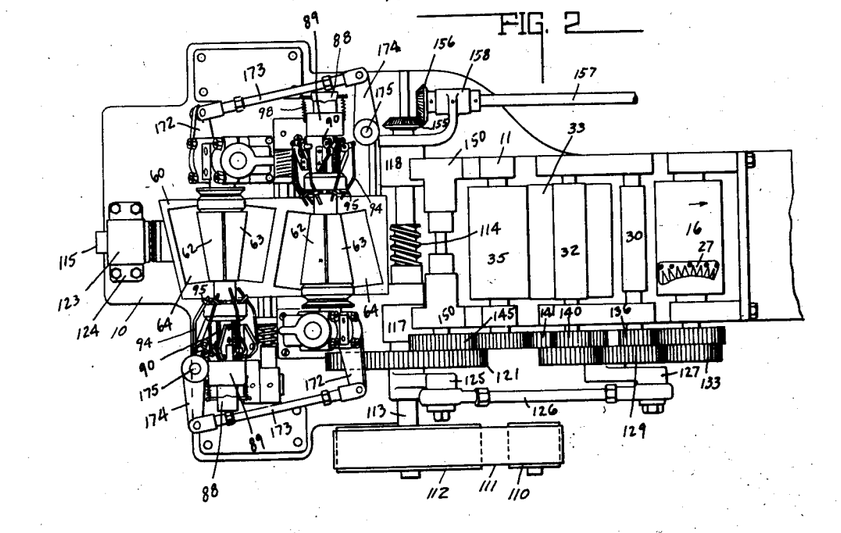
Fig. 2 is a similar view with the parts in position when the cups are being formed.
Figure 12:
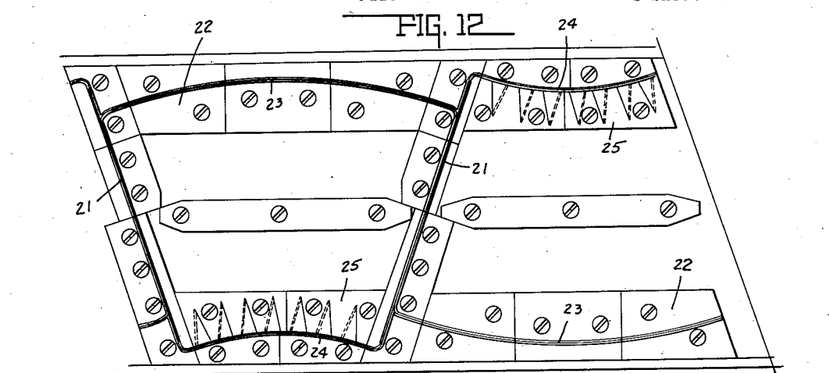
Fig. 12 is a plan view of the dies in flat form for creasing and trimming the blank.
Figure 13:
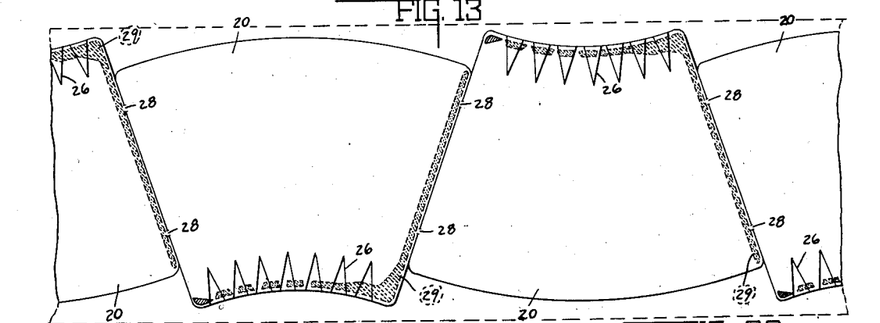
Fig. 13 is a plan view of the successive series of blanks cut from one sheet of paper, the lateral margins of the sheet of paper being indicated by dotted lines.

A sheet of paper, not shown, is fed in the machine at the right hand end in Figs. 1 and 2, which is herein termed the front end of the machine. The sheet of paper passes between the creasing rolls 16 and 17. The upper creasing roll 16 is shown in Figs. 1 and 2 and a pair of creasing rolls appear in Fig. 11. These are cylindrical rolls and the lower roll 17 has on its periphery a curved cutting die plate 22 formed as shown in Fig. 12 with two obliquely transverse cutters 21 for cutting the sheet to form the blanks 20 shown in Fig. 13 to form two cups. These knives 21 are oppositely inclined so that each section of the blank for each cup will be wider at the top than at the bottom and the narrow ends of the two sections of the blank will be diagonally opposite each other, as shown, and the same is true of the wider ends. Likewise on said die plate 22 there are two pairs of transversely extending knives 23 and 24 to trim the top and bottom edges of the sheet of paper. The knife 23 is opposite the knife 24 and the knife 23 trims the upper end of a blank section for a cup while the knife 24 trims the lower end, as seen in Figs. 12 and 13. There is also on said die plate 22 two creasing plates 25 located adjacent the knife for trimming the lower ends of the cup sections. The creasing plates are for forming substantially parallel creases 26 for forming the bottom of the cup. Said two creasing dies 25 are located on opposite sides of roll 17 and at opposite ends and they cooperate with creasing dies 27 on the upper roll 16 and are correspondingly located. One set of these creasing dies is male and the other female.

The transverse cutting knives 21 do not entirely sever the sheet but leave two small connections 28 in each line of severance for the purpose of holding the cup sections together in sheet form while passing through the machine, but which enables them to be separated easily when they reach the cup forming stage in the operation of the machine.

From the foregoing it is seen that the roll of paper which is fed into the machine is formed into individual cup sections with the margins and creases therein all finished, yet the sections are still held together by fragile connections whereby the sheet may still be fed on further. The cup sections of the blank are reversely arranged when they are cut, as shown in Fig. 13, that is the tops and bottoms of the cup sections alternate. This is for the purpose of enabling the maximum number of sections to be cut from one sheet of paper and also to minimize the waste as the width of the cup sections is nearly as great as the width of the roll of paper. From the cutting and creasing rolls 16 and 17 the connected series of blanks 20 pass between a pair of feed rolls 30, only the upper one of each pair being shown in Figs. 1 and 2, but the spindles are shown in Figs. 3 and 4.

Figure 14:
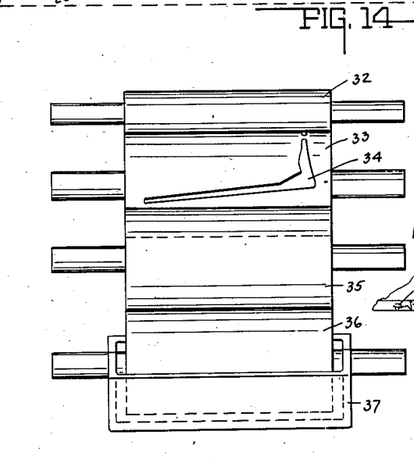
Fig. 14 is an elevation of the glue rolls.

*Blank gluing mechanism.*—Then the strip of connected blanks passes to the gluing mechanism which applies glue to the under side of each blank 20, as shown in Fig. 13, along one lateral edge at 29 and the bottom edge, that is the scored portion that is to subsequently form the bottom of the cup. The connected series of blanks 20 pass between the pressure roll 32 and the glue roll 33 under it which has on its periphery two glue pads 34 each formed in the same way as the strips of glue 29, shown in Fig. 13. These glue pads are on opposite sides of the roll and they are oppositely located, that is one of the glue pads is positioned oppositely to the other on the roll so that during each revolution of the roll glue will be applied, as shown in Fig. 13, to two cup blanks 20. The glue is applied to said glue pads by the roll 35, the peripheral surface of which is supplied with glue from a glue roll 36 under it which picks up glue from the glue pot 37, as seen in Fig. 14.

Figure 20:
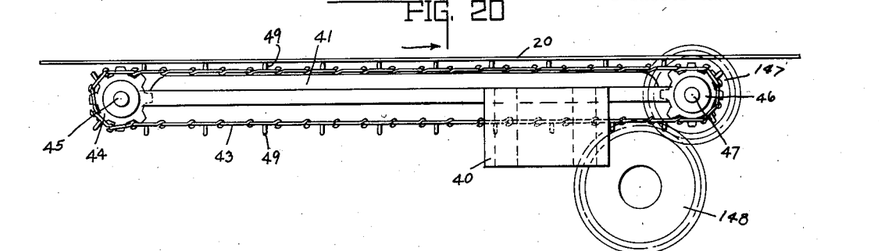
Fig. 20 is a side elevation of the bridging means extending from the gluing roll to the cup forming roll and the cup blanks traveling thereon.
Figure 21:
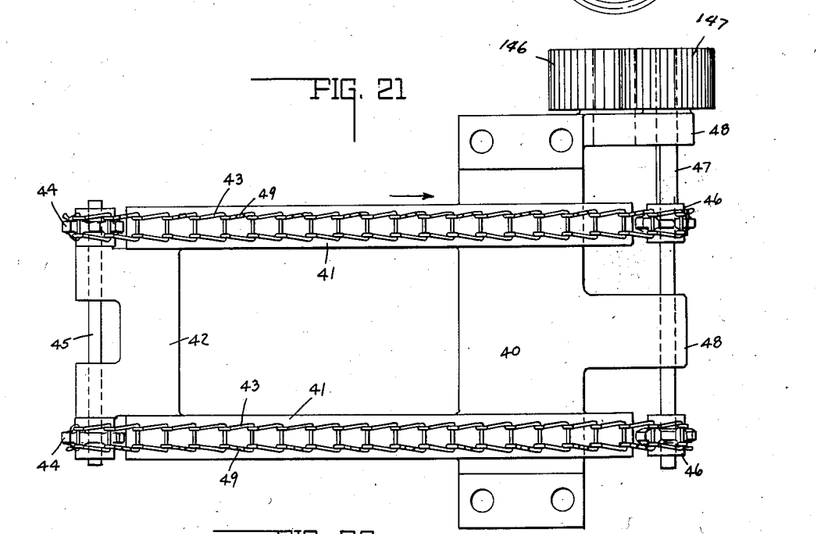
Fig. 21 is a plan view of what appears in Fig. 20.

The sheet or series of cup blanks is fed from the glue roll 33 to the cup forming mechanism over a bridge which spans the glue covered roll 35 and keeps the series of blanks from coming in contact with said glue covered roll. The detailed construction of this bridge appears in Figs. 20 and 21. It consists of a bridge frame composed of the transverse plate 40, the lateral plates 41 and the bearing plate 42 all rigidly secured together. The plate 40 is secured to the plates 150 on the side frames 11 and 12. A pair of parallel sprocket chain conveyors 43 are mounted on said bridge frame, as shown in Fig. 21, and each of said chains is carried at one end by a sprocket wheel 44 on a shaft 45 in the bearing plate 42 and the other end on a sprocket 46 on the shaft 47 that has bearings at 48 in the plate 40. The shaft 47 is driven by the gearing hereafter explained so that the chain conveyors 43 will move in the direction of the arrow, shown in Figs. 20 and 21. The chains have blank engaging lugs 49 on which the blanks 20 are carried and fed through the machine, as shown in Fig. 20.

Figure 17:
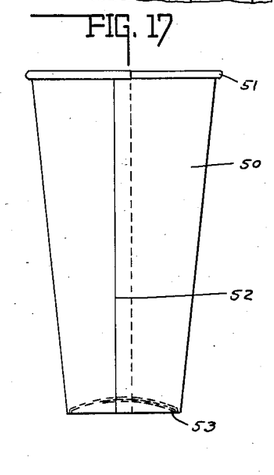
Fig. 17 is a side view of the finished cup.
Figure 18:
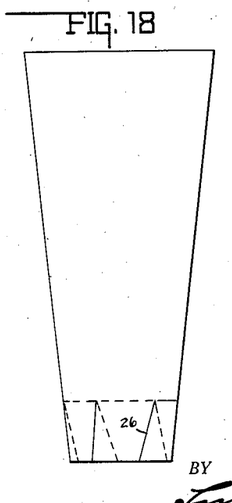
Fig. 18 is a side view of the blank just after it has been coiled around the core and before its ends have been formed.

*Cup forming mechanism.*—The cup 50 to be manufactured is shown in Fig. 17. Its form is that of a frustrum of a cone with a larger end upward and having formed on it a bead 51. There is a glued seam at 52 where the two overlapping lateral edges of the blank are glued together. The bottom 53 of the cup is integral with the body thereof and is formed from the creased extension of the body of the cup shown in Fig. 18.

It is observed that the upper and lower edges of each cup blank 20 are curved concentrically and that the creases 26 are triangular with the lower edge of the blank forming the base of each triangle. The problem in making the cup from the blank is to roll the blank in cylindrical shape so as to overlap the lateral edges which will be held together by the glue already placed on the blank, and second, to turn the top of the blank over to form the bead 51, and third, to fold the crease at lower portion of the blank and turn the same in and glue the same together for forming the bottom 53 of the cup.

Figure 15:
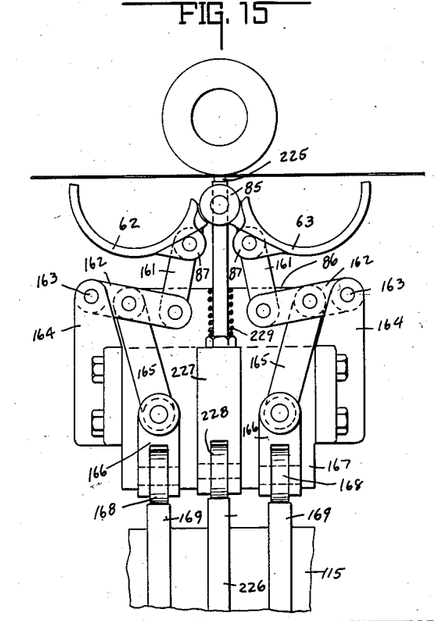
Fig. 15 is a vertical section through a part of the portion of the machine devoted to the formation of the cup, when the cup blank has just passed under the cup forming core, parts being broken away and parts being in section.

The left hand part of the machine, as shown in Fig. 1, has a horizontal plate 60 extending longitudinally of the machine under the cores or formers 61 and over the hinged mold sections 62 and 63, as shown in Fig. 15. The table 60 has recesses 64 or openings through it for receiving the mold sections 62 and 63 when they are opened and folded down, as shown in Figs. 1 and 15. The cores or formers 61 are formed in the shape of a frustrum of a cone, or the shape of the paper cup to be formed and of the same length, and they have air escape grooves 66 around the same and at 67 longitudinally thereof and extending from the peripheral grooves to the upper end of the core, so that as the paper blank 20 is wrapped around the same the air will escape from between the blank and the core so that the paper will fit down tightly on the core, see Figs. 9 and 10. The width of the blank 20 is greater than the length of the core, to the extent of the creased bottom extension thereof. In the machine herein shown there are two cores 61 and associated hinged mold sections 62 and 63 so that two cups may be formed simultaneously and for that purpose the feed of the strip of blanks 20 through the machine is such as to feed two blanks at a time under the cores, one for each core. The driving and feeding mechanism will hereafter be explained.

When the machine is in the idle position, shown in Fig. 1, and the blanks are fed in under the cores, the cores are in their discharging or oblique position, as shown in Fig. 1. After the blank is in place, the cores are oscillated or turned from their oblique position, shown in Fig. 1, to their transverse position, shown in Fig. 2, and the hinged mold sections 62 and 63 are brought up into the position to surround the core, as seen in Fig. 2. As this action takes place, the mold sections wrap the blank 20 around the core and hold it there tightly with creased extension at the lower end extending beyond the core and mold as above stated and the wider or upper end projecting sufficiently beyond the core and mold to enable a bead 51 to be formed. When the mold sections 62 and 63 enclose the blank on the core, the lateral edges of the blank overlap each other to the extent of the width of the glue strip 29 which has already been deposited on one of them. In this manner the adjacent lateral edges of the blank are permanently secured together.

The core is secured on an arbor 70 which is secured on an upwardly inclined trunnion 71 which oscillates in bearings 72 and 73, see Fig. 5. The bearing 72 is on the curved arm 74 that extends up from the frame plate 75, see Fig. 5. As seen in said figure, the frame plate 75 is provided with two sections, one at each side of the machine and spaced apart and are connected by a U-shaped portion 76. The lower bearing 73 is mounted on the same arm 74. The shaft 71 is oscillated by means hereafter explained so as to move the core to the discharging position, shown in Fig. 1, and the cup forming position, shown in Fig. 2.

Figure 19:
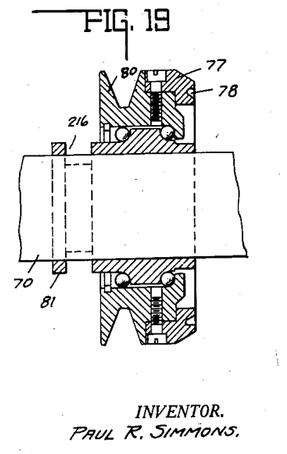
Fig. 19 is a vertical section through the means for forming the bead on the upper end of the cup, parts being broken away.

The cone also has at its inner end a bead forming collar 77 that has an annular groove 78 in it, as shown in Fig. 19 for forming the bead 51 on the cup. The collar 77 is associated with and secured to the pulley 80, see Fig. 9, which is rotatably mounted on the arbor 70 and also has longitudinal movement or adjustment thereon. The collar 77 is moved to the right by means hereafter explained as it is being rotated so as to form the edge of the cup blank 20 which projects it into the groove 78 of the collar. This operation takes place while the core is in the position shown in Fig. 2 and the cup is being formed.

The mold sections 62 and 63 are hinged by hinges 85, see Fig. 6, to a plate 86 that is secured on the plate 75 and they are opened and closed by means hereafter explained connected with the ears 87 on the bottom sides of the sections, as seen in Fig. 6.

The cup bottom forming mechanism will now be described. The creased end of the cup blank after it surrounds the core 61 and while the lateral edges are united is folded in against the bottom of the core by the die 55 on the end of the plunger 56 reciprocal in the stationary sleeve 57. The die plunger reciprocates in the finger sleeve 57 and is moved towards the cup forming core by the arm 88, shown in Fig. 5, and in such movement carries with it the rack sleeve 89 which has a series of racks 90 extending longitudinally thereof and angularly spaced from each other. The finger sleeve 57 has radial ears 91 in which crank shafts 92 are rotatably mounted which carry cranks 93 pivotally connected with the bent folding fingers 94 which extend therefrom towards the core 61 and their forward ends operate through guides 95, as seen in Fig. 5. The crank shaft 92 is rotated by a gear 96 thereon which meshes with a gear 97 carried by the ear 91 and which engages one of the racks 90. Therefore, a movement of the die plunger 56 and rack sleeve 89 will cause a revolution of the crank shafts 92 for moving the fingers 94. The series of cranks 93 are so set angularly and with reference to each other that the fingers will be moved forward in succession and return also in succession. The fingers are bent inward so that each of them will engage one of the folds in the creased extension of the cup blank that is to form the bottom of the cup. Therefore, when said fingers move towards the core, one at a time, in rapid succession, they will fold the bottom extension end and do so before the die 55 comes in contact with said folded in bottom.

Then the further movement of the die plunger 56 will force the die against the bottom of the cup and since the folds thereof already have glue on them, they will be folded together and the bottom strongly and correctly formed. While the die is near the bottom of the cup or end of the core and is approaching the same, the fingers 94 will be returning to the backward position and then the arm 88 will return to the position shown in Fig. 5, and in doing so the springs 98 will return the rack sleeve 89. The die 55 itself is provided with radial grooves 99 dividing it into sectors corresponding with the folds of the bottom of the cup so that it will exert an even pressure on all parts of the paper constituting the cup and thus form the same better than if the die were smooth. In order to operate in this fashion, the relation of the die to the core is fixed and also the blank feeding means geared to operate so as to maintain an accurate registry between the die and the bottom of the cup on the former.

*Cup ejecting means.*—After the cup has been formed as explained above, that is the lateral margins thereof united, the top being formed and the bottom folded in and secured in place, all preferably simultaneously, the mold members 62 and 63 are released and opened and turned downwardly in openings in the plate 60 and then the cores are moved into their oblique positions, as shown in Fig. 1, by means hereafter explained, and the cup thereon is pushed outwardly and discharged by means of the finger rod 100 which is shown in Fig. 5. This rod is in its position after ejection of the cup. The retracted position is shown in Fig. 2 and in such position it is where, upon operation, it will engage the bead which is formed upon the upper end of the cup and when the discharged finger is moved forward, as shown in Fig. 1, it will push the cup off the core and discharge the same. This finger 100 is secured to a post 101, which is provided at its lower end with a compound crank 102 through the outer portion of which a horizontal rod 103 extends loosely and has a spring 104 on each side of the crank. When said last mentioned rod is moved longitudinally by means hereafter explained, it rocks the post 101 and the finger is guided between its ends by a stationary arm 105 so that such oscillatory movement of the post will move the finger from the position shown in Fig. 6 to the position shown in Fig. 1 and effect the discharge of the cup. A reverse movement of the rod 103 will return the finger from the position shown in Fig. 1 to that shown in Fig. 6.

The construction of the cup discharging mechanism just described is the same for each cup forming mechanism and, therefore, the two discharging mechanisms are on opposite sides of the machine and reversely positioned as appears in Figs. 1 and 2.

*The driving mechanism.*—Referring to Figs. 1 and 2 there appears a motor pulley 110 operated by a motor, not shown, which drives the belt 111 upon pulley 112 on shaft 113; see also Fig. 4. The shaft 113 has bearings in the stand or upright bearing arm 117, see Fig. 4, and in the bearing stand or arm 118, see Fig. 1. The shaft 113 carries a gear 120 which meshes with a larger gear 121 on a counter shaft 122 which is mounted in the bearing arms 117 and 118, as seen in Fig. 2, and has midway its length a worm 114 which meshes with a gear, not shown, beneath it which is rotated on and drives a longitudinally extending cam shaft 115 which operates in a bearing 123 on the bearing stand 124, see Fig. 4, and in a similar bearing at the other end of said shaft, see Fig. 22.

The shaft 122 drives the gearing that operates the rolls, see Figs. 1, 2 and 4. The shaft 122 has on it a crank 125 pivoted to a connecting rod 126 that in turn is pivoted to another crank 127 loosely mounted on the shaft 128 extending transversely of the machine and intermittently drives the gear 129 by pawl and ratchet mechanism. The pawl 130 is mounted on the crank 127 and is spring held by the spring 131 and is adapted to engage the ratchet disk 132 secured to the side of the gear 129 so as to drive the gear 129 clockwise and intermittently. The shaft 128 is mounted in the side frames 11 and 12. The gear 129 engages a gear 133 on the lower creasing and trimming roll 17. This roll carries the gear 134 which meshes with the gear 135 on the creasing and cutting roll 16, and the two gears 134 and 135 have the same diameter so that they operate the rolls 16 and 17 at the same speed. The ratchet plate 132 has four notches in it equidistant from each other so that at each operation the gear 129 is given one-fourth of a revolution and that rotates the creasing and cutting rolls 16 and 17 one revolution, which is sufficient to crease and cut the sheet of paper to make two blanks 20 oppositely disposed with relation to each other as we have heretofore seen and as shown in Fig. 13.

The feed rolls 30 have gears 136 thereon which are driven by the idler gear 137 which in turn is driven by the gear 134. The gearing for driving these feed rolls is such as to make them rotate with substantially the same surface speed as the rolls 16 and 17.

The rolls for applying glue to the paper blanks are driven by the following means: The pressure roll 32 is driven by a gear 140, see Fig. 4, that is in mesh with and driven by a gear 141 on the glue roll 33. The gears 140 and 141 are in the same proportion as to size as the respective rolls upon which they are mounted, so that the surface speed of the rolls 32 and 33 is substantially the same. The roll 33 is driven by a gear 142, secured thereon as shown in Fig. 4, and which meshes with the large gear 129 and is driven therewith by periodically and at the same times and substantially the same speed as the rolls 16 and 17 and also the feed rolls 30. Also the gear 141 on the glue roll 33 drives the other rolls 35 and 36 composing the series of glue rolls and at the same speed through the means of the gears 143 and 144 on the said rolls 35 and 36, respectively.

The bridge over which the cup blanks are moved from the gluing mechanism to the cup forming mechanism, which is illustrated in Figs. 1, 20 and 21, is also driven by the gearing which drives the glue rolls, through a gear 145 on a shaft 146 mounted transversely in the frame, as shown in Fig. 4. The gear 145 is driven by the gear 143 of the glue roll 35 and since said gears are of the same size, they operate at the same speed. The gear 145 drives an idler 148 which drives a gear 147 on the small shaft 47 mounted transversely in the frame of the machine, as shown in Fig. 1. The sprocket wheels 46 of the bridge are secured on said shaft 47. The relative arrangements of these parts are such as to cause the bridge to travel at substantially the same speed as the surface speed of the rolls 16, 17, 30, 32 and 33 which feed the paper blanks through the machine.

As seen in Fig. 3, the shaft 122 carries a bevel gear 155 which meshes with another bevel gear 156 on a shaft 157 mounted in a bearing member 158. This shaft extends forward beyond the present machine to the mechanism which feeds the paper from a roll into this machine, and the purpose of which is to regulate the feeding of the sheet from the roll, but said mechanism is herein omitted.

Figure 16:
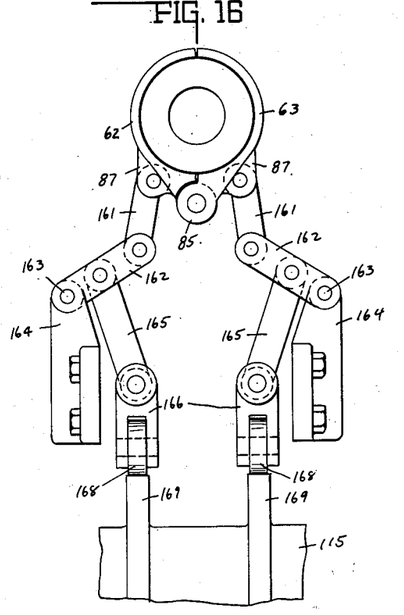
Fig. 16 is a similar view of one of the parts in Fig. 15, showing the altered position when the paper blank has been folded around the core.
Figure 22:
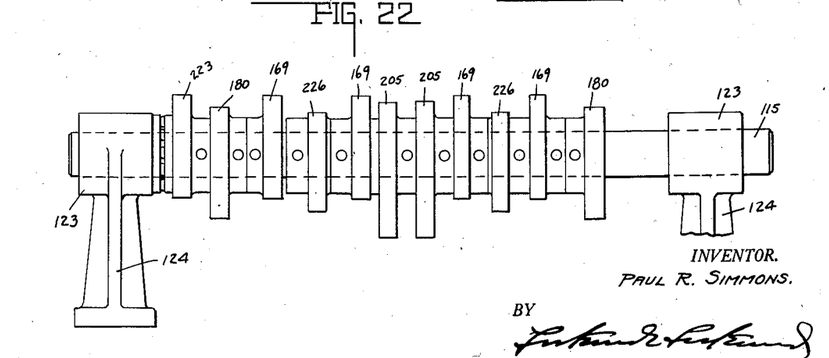
Fig. 22 is a side elevation of the cam shaft with parts broken away.

The means for operating the cup mold members 62 and 63 is shown in Figs. 15 and 16. Each of said members has an ear 87 thereon to which a link bar 161 is pivoted which in turn is pivoted to another link bar 162, and said bar 162 is pivoted fixedly at 163 on a stationary bracket 164. Another link bar 165 is pivoted to the link bar 162 between its ends and also to a vertical roller plate 166 which is guided by the guides 167 and carries on its lower end a bearing roller 168 that rides on a cam 169 of the cam shaft 115. The means for operating the two molds 62 and 63 are similar, as shown, so that through the action of the cam 169 said mold members will be pushed upward to enclose the core 61, and they are returned to their downward position by the springs 170, see Fig. 5. There are four of the cams 169, two for each pair of cup forming mold members 62 and 63, as seen in Fig. 22.

The cores 61 are oscillated by the oscillatory movement of the trunnion 71 on which each of them is secured. The trunnion 71 for each of the cores has secured on its lower end a crank arm 172, as seen at the left-hand end of Fig. 5, which at its outer end is pivoted to a connecting rod 173, see both left and right hand sides of Fig. 5, which, in turn, is pivoted to the outer end of a link arm 174 which is secured to a short stub shaft 175 in a bearing 176, and the shaft 175 has on its lower end a short crank arm 177 that is pivotally connected with a connecting link 178 horizontally disposed and which at its inner end carries a roller 179 that engages a cam 180 and is held up in place by a connecting bar 181 pivoted at its lower end at 182 to a stationary part of the frame. The constructions of both sides of the machine for operating the respective cores 61 are substantially the same, although the lower part of said mechanism at the left-hand part of the machine extends rearwardly of the machine relatively, while the corresponding part of the right-hand end of the machine extends forwardly, as shown. Each revolution of the cam shaft 115 causes the rod 71 and intervening mechanism to oscillate to a substantial degree to move each core 61 from the position shown in Fig. 2 to that shown in Fig. 1, and the reverse. The ejecting movement is effected by a tension spring 183, seen in Fig. 5, one end of which is fastened to the connecting bar 181 and the other end to the pin in the bed of the machine, and the return movement is effected by the cam 180.

The bead forming collar associated with each core 61 is rotated by the pulley 80 associated therewith and a belt or cord 186 extending therefrom over a pulley 187 secured on a shaft 188 mounted in a bearing 189 secured on the top frame bar 14, see Figs. 5 and 6. The shafts 188 are driven by a pulley 190 and belt 191 extending down to a pulley 192 on an electric motor 193. The lengths of the belts 186 are such that their operation is not interfered with by the oscillatory movement of the cores 61 heretofore explained. The driving mechanism for the bead forming collar 77 operates constantly. One shaft 188 is driven by the other shaft 188 through the gearing 288 on their adjacent ends.

Figures 7, 8, 9, 10, 11:
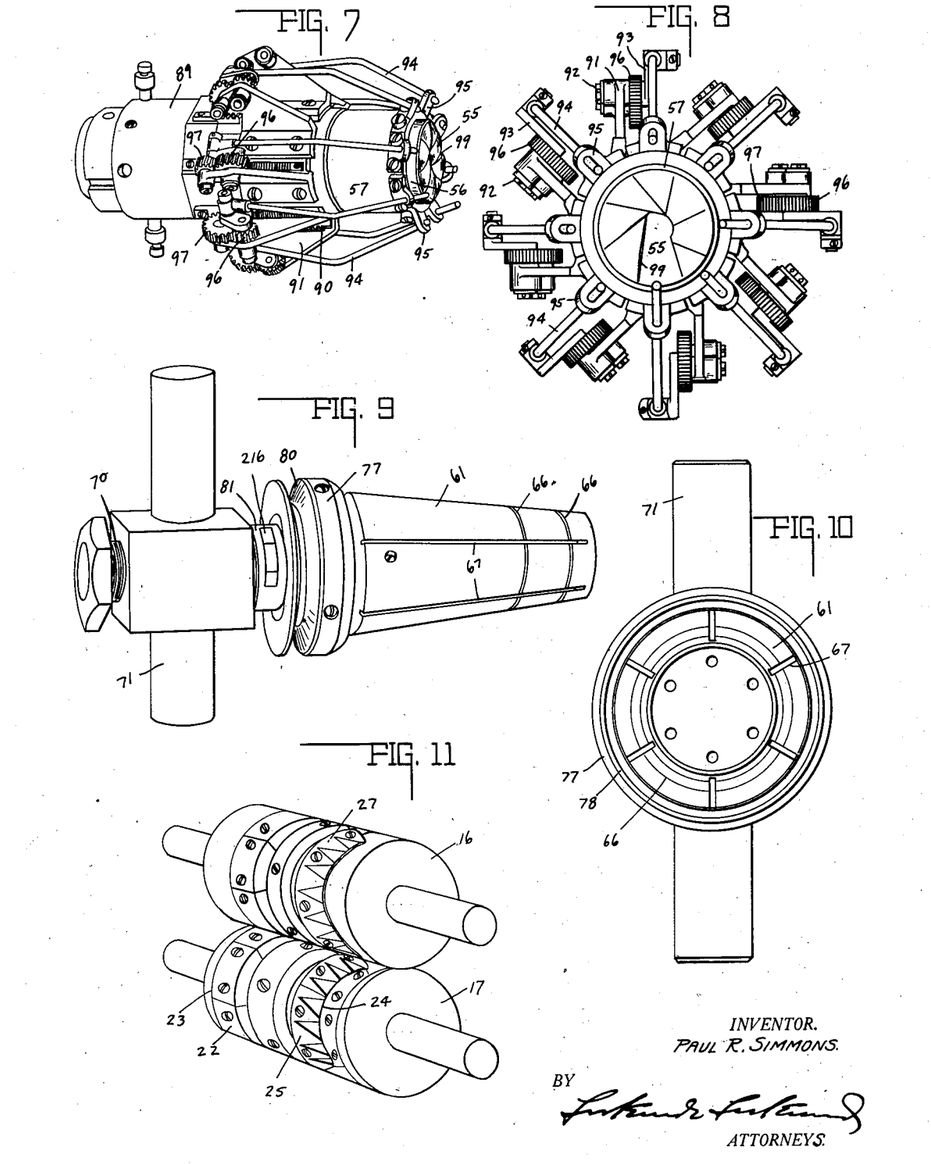
Fig. 7 is a perspective view of the mechanism for forming the bottom of the cup.
Fig. 8 is an elevation of the right hand end of what is shown in Fig. 7.
Fig. 9 is a perspective view of the core of the mold mechanism.
Fig. 10 is an elevation of what is shown in Fig. 9 viewed from the right hand end.
Fig. 11 is a perspective view of the creasing and trimming rolls.
Figure 23:
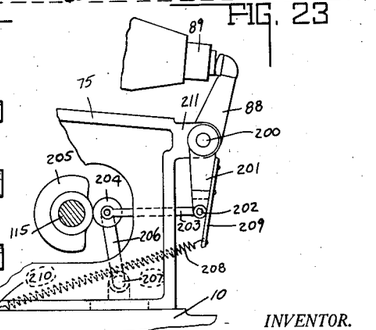
Fig. 23 is a view in substantially vertical section through a part of the machine for showing the means for operating the mechanism for forming the bottom of the cup, parts being broken away.

The means for forming the bottom of each cup, there being one associated with and opposite the smaller end of each core 61, and as shown at the right-hand sides of Figs. 5 and 6 and in detail in Figs. 7 and 8, is operated by the rocker arm 88, as heretofore explained. Said rocker arm is pivoted by a pivot 200 in a bracket 211 secured to the frame. Said shaft 200 has secured on its rear a crank arm 201 like that shown in the left-hand side of Fig. 5. It is pivotally connected at 202 with a rod 203 which extends horizontally and at its inner end carries a roller 204 which engages a cam 205 on the cam shaft 115. The roller is held up in position by a bar 206 pivoted at its lower end at 207 to the frame of the machine, see Fig. 23. Said mechanism just described forces the die member 35 inward to form the bottom of the cup and it is returned by a spring 208 which, at its outer end, is connected to a bar 209 secured to the lower end of the crank arm 201, and at its inner end the spring is secured to the frame at 210.

The means for moving the bead forming collar 77 to the right, as shown in Fig. 9, towards the core 61, in order to bring it into engagement with the edge of the paper blank, consists of a curved arm 215, shown in Figs. 5 and 6. The upper end of that arm enters a slot 216 in the hub 81 of the pulley 80 that is secured to the collar 77, so that said arm 215 can shift said collar 77. The arm 215 is rocked on the arbor 185 by a crank arm 217 which is oscillated by the connecting bars 218 which in turn is pivoted to a rocker arm 219 on an arbor 220 and is actuated by an arm 221 that carries a roller 222 on its lower end, which roller 222 engages a cam 223 on the cam shaft 115. Said parts are returned by a spring 224.

While the mold members 62 and 63 are being elevated to force the paper cup blank around the core 61, the paper blank is engaged and held from displacement by two fingers 225, seen in Fig. 6. They frictionally engage the paper during said part of the process and afterwards in disengaging position, they are as shown in Fig. 5. These fingers are vertically reciprocable in the plate 86 by the cams 226 on the cam shaft 115. These cams actuate a bar 227 connected with the lower end of the fingers 225 and have rollers 228 on the lower end thereof which ride on the cams 226. The vertical movement of the fingers 225 is yieldingly resisted by a spring 229 with its upper end against the plate 86 and its lower end against the bar 227 so that it holds the roller 228 on the cam 226.

Means for operating the ejector 100 has been heretofore partially explained. The post 101 is oscillatably mounted in the outer end of an arm 213, seen at the left-hand end of Fig. 1, which arm is secured to the rigid member 74. The reciprocating rod 103, which actuates the ejector 100, is connected at its inner end to the crank arm 172, which is a part of the means for oscillating the core 61 so that said two parts operate together and practically in unison. That is, as the core is oscillated from the position shown in Fig. 2 to that shown in Fig. 1, the ejector is at the same time operated so as to eject the cup from the core, as heretofore explained.

The consecutivity and timing of the means heretofore described for driving the cup-forming part of the machine are predetermined and controlled by the cams on the cam shaft 115, which is shown in Fig. 22. The cams 226 move the fingers up against the bottom of the cup blank for holding it in position against the core. The cams 169 actuate the hinged mold members 62 and 63 to cause them to fold the sheet of paper around the core. The cams 205 operate the cup bottom forming means. The cam 223 operates the mechanism which forms the bead on the upper end of the cup. The cams 180 oscillate the cores to move them to the cup ejecting position and also actuate the ejecting means for discharging the cups from the cores.

The means for actuating the bridge shown in Figs. 20 and 21, are so geared that the means for feeding the paper blanks are so that the glued portion of the blanks will be between the pins 49. Therefore, the pins 49 will not engage any of the glued portion of the blanks and thus prevent the glue on the blanks from coming in contact with any part of the machine or from being interfered with by any parts of the machine. The timing and sequence of movement of the other parts of the machine are controlled and regulated by the gearing heretofore described.

The invention claimed is:

1. A machine for forming paper cups including means for bending a paper blank cylindrically to form the body of the cup, means for folding in a marginal part of the paper blank to form the bottom of the cup, means for forming a bead on the upper end of the cup, and means for simultaneously operating the means for forming the body, the bottom, and the bead on the upper end of the cup.

2. A machine for forming paper cups including means for applying glue to the bottom edge and one of the side edges of the paper blank, means for bending the blank cylindrically and causing the lateral edges to overlap and adhere together to form the body of the cup, and means for folding in the bottom of the cup under pressure so that the folds will be secured permanently together.

3. A machine for forming paper cups including the construction set forth in claim 2, and means for turning the upper edge of the cup to form a bead thereon.

4. A machine for forming paper cups including the mechanism set forth in claim 2 with the means for forming the body, bottom and bead forming means adapted to operate simultaneously.

5. A machine for forming paper cups including means for cutting a paper blank to form a cup, and means for creasing one marginal portion thereof to provide it with V-shape creases whereby it can be folded in with overlapping folds to form the bottom of the cup.

6. A machine for forming paper cups including means for cutting a paper cup blank to form a cup having side edges adapted to overlap when the blank is bent cylindrically, means for creasing one marginal portion thereof to provide it with V-shaped creases, whereby it can be folded in with overlapping folds to form the bottom of the cup, and means for applying adhesive material to said creased portion and one side edge of the blank for securing the adjacent parts of the blank together when the cup is formed.

7. A machine for forming paper cups including means for cutting a paper cup blank to form a cup, which blank has a convex upper edge to form the top of the cup, a shorter concave opposite edge to form the bottom of the cup, and straight side edges connecting said top and bottom edges, means for creasing the bottom portion of the blank with V-shaped creases, whereby the same may be folded accurately in upon each other to form the bottom of the cup when the blank is in a cylindrical form, and means for applying adhesive material to the bottom folds and one side edge thereof for securing the adjacent parts of the cup when the cup is formed.

8. A machine for forming paper cups including a pair of rotary rolls engaging each other and between which a strip of cup-forming paper may be fed, a male cutting die on the surface of one of said rolls, a female cutting die on the surface of the other roll arranged to cooperate and cut the sheet of paper into individual cup-forming blanks with the cutting portion at one side of said dies being convex and the cutting means at the opposite side of the die being shorter and concave and the cutting means at each side of the die extending between the ends of the side curved portions of the die and obliquely arranged with reference to each other, and a creasing die adjacent the shorter curved end of the cutting die so as to form V-shaped creases in the narrow end of the paper as the same is being cut into cup blanks.

9. A machine for forming paper cups including a pair of rotary rolls engaging each other and between which a strip of cup-forming paper may be fed, a plurality of male cutting dies on the surface of one of said rolls arranged peripherally adjacent each other, and a plurality of female cutting dies on the surface of the other roll arranged to correspond and cooperate with the male cutting dies, each die having one cutting edge in convex form and the opposite cutting edge shorter and in concave form and the side edges tapering towards each other and the adjacent dies being reversely arranged with reference to each other, substantially as set forth.

10. A machine for forming paper cups including the means set forth in claim 9, and a creasing die adjacent the shorter concave edge of each of said dies for creasing the paper, whereby said creasing dies will be arranged first near one end of the rolls in one die construction and near the other end of the rolls in the adjacent die construction, substantially as set forth.

11. A machine for forming paper cups including the means set forth in claim 9, and a pair of rotating glue rolls between which said cup blanks are adapted to pass, one of said glue rolls having on its surface a glue applying strip adapted to engage and apply glue to one side edge and the creased bottom edge of the blank, substantially as set forth.

12. A machine for forming cups including the means set forth in claim 9, and a pair of rotating glue rolls between which said cup blanks are adapted to pass, one of said glue rolls having on its surface a glue applying strip adapted to engage and apply glue to one side edge and a creased bottom edge of the blank, a glue receptacle, and a rotary roller adapted to take up the glue from said receptacle and engage said glue applying strip for supplying it with glue.

13. A machine for forming paper cups including the means set forth in claim 9, and a pair of rotating glue rollers between which said cup blanks are adapted to pass, one of said glue rolls having on its surface a glue applying strip adapted to engage and apply glue to one side edge and the creased bottom edge of the blank, said glue roll having on its surface a plurality of said glue applying strips reversely arranged with reference to each other, whereby said roll at each revolution will glue reversely arranged cup blanks.

14. A machine for forming paper cups including rotary rolls for forming cup blanks from a strip of paper fed into the machine, rotary glue rolls for applying glue in a narrow strip along a plurality of adjacent edges of the cup blanks, a pair of feed rolls between said blank forming rolls and glue rolls, and means for driving all of said rolls so that they will have substantially the same surface speed.

15. A machine for forming paper cups including a pair of glue rolls for applying glue to portions of paper cup blanks fed between them, mechanism for forming cups from said blanks, and a bridge located between the glue rolls and the cup forming mechanism and movable toward the latter for protecting the glue on the cup blanks from interference with parts of the intervening machinery.

16. A machine for forming paper cups including the means set forth in claim 15, said bridge having upwardly extending fingers to engage the cup blanks and located so that they will not engage the portion of the cup blanks having glue thereon.

17. A machine for forming paper cups including a pair of glue rolls for applying glue to portions of paper cup blanks fed between them, mechanism for forming cups from said blanks, a bridge located between the glue rolls and the cup forming mechanism and movable toward the latter for protecting the glue on the cup blanks from interference with parts of the intervening machinery, said bridge having upwardly extending fingers to engage the cup blanks and located so that they will not engage the portion of the cup blanks having glue thereon, and means for driving said glue rolls and bridge so that the portion of each cup blank containing the glue will come between said fingers on the bridge so as not to be interfered with thereby.

18. A machine for forming paper cups including the means set forth in claim 15, said bridge consisting of a horizontally-disposed frame in fixed position, a transversely arranged shaft at each end of said frame, means for driving one of said shafts, a plurality of endless chains extending parallel with each other and longitudinally of the machine and operated and moved by said actuated shaft so that the upper portion will travel towards the cup forming mechanism, and vertical outwardly extending pins on said chains, substantially as set forth.

19. A machine for forming paper cups including means for applying adhesive material along one side edge and the bottom of a paper cup blank, a core, means for feeding the paper cup blank to a position adjacent the core, means for folding the core around the blank so that the side edges overlap for forming the body of the cup and so that the blank extends beyond one end of the core, and means for folding in said extended end of the blank against the bottom of the core for forming the bottom of the cup.

20. A machine for forming paper cups including the means set forth in claim 19, and fingers movable in a position to engage the paper blank and hold it in place against the core before the same is folded around the core.

21. A machine for forming paper cups including means for applying adhesive material along one side edge and the bottom of a paper cup blank, a core, means for feeding the paper cup blank to a position adjacent the core, means for folding the blank around the core so that the side edges overlap for forming the body of the cup and so that the blank extends beyond one end of the core, and means for folding in said extended end of the blank against the bottom of the core for forming the bottom of the cup, fingers movable in a position to engage the paper blank and hold it in place against the core before the same is folded around the core, and means for returning said fingers to a disengaging position after the cup has been formed.

22. A machine for forming paper cups including the means set forth in claim 19, said core being provided with longitudinal and peripheral grooves, substantially as and for the purpose set forth.

23. A machine for forming paper cups including means for creasing one end of a paper cup blank, means for gluing the paper blank along the creased edge and one side edge, a core for forming the cup which is short enough to permit the creased end of the paper blank to extend beyond the core, means for folding the paper blank around the core, fingers movable into position to fold the creased end of the paper blank inward against the end of the core, and a die movable against the bottom of the cup to the end of the core for forming the bottom of the cup.

24. A machine for forming paper cups including the means set forth in claim 23, and means for operating said fingers in succession.

25. A machine for forming paper cups including the means set forth in claim 23, a stationary sleeve surrounding the die, guides on the sleeve near the end of the die for the forward end of the fingers, a crank arm with which the rear end of each finger is connected, and means for rotating the crank arm so that the finger will have a movement inward as well as forward for folding the creased end of the paper cup blank.

26. A machine for forming paper cups including means for creasing one end of a paper cup blank, means for gluing the paper blank along the creased edge and one side edge, a core for forming the cup which is short enough to permit the creased end of the paper blank to extend beyond the core, means for folding the paper blank around the core, fingers movable into position to fold the creased end of the paper blank inward against the end of the core, a die movable against the bottom of the cup to the end of the core for forming the bottom of the cup, a stationary sleeve surrounding the die, guides on the sleeve near the end of the die for the forward end of the fingers, a die for the forward end of the fingers, a crank arm with which the rear end of each finger is connected, means for rotating the finger so that the finger will have a crank arm so that the finger will have a movement inward as well as forward for folding the creased end of the paper cup blank, and means substantially as shown for causing the die and fingers to have simultaneous advancing and return movement.

27. A machine for forming paper cups including the means set forth in claim 23, and in addition thereto a stationary sleeve surrounding the die, guides on the sleeve near the end of the die for the forward end of the fingers, a crank arm with which the rear end of each finger is connected, means for rotating the crank arm so that the finger will have a movement inward as well as forward for folding the creased end of the finger blank, a rack for each finger movable with a die, a gear for each finger mounted on said sleeve and engaged and actuated by said rack, and a gear mounted in connection with said sleeve and driven by said first mentioned gear for revolving the crank arm for each finger, substantially as set forth.

28. A machine for forming paper cups including a tapering core on which a paper cup may be formed, means for mounting said core so that it will be laterally oscillatable, a finger for ejecting the cup after the core has been oscillated, and means for simultaneously oscillating the core and actuating the ejecting finger.

29. A machine for forming paper cups including a stationary tapering core about which a paper cup blank is coiled to form a paper cup arranged so that one edge of the paper blank will extend beyond the end of the core, an annular member revoluble axially of said core and provided with a bead forming groove, and means for moving said bead forming member against the end of the paper blank when on the core, whereby while it revolves it will form the bead on the upper end of the cup.

30. A machine for forming paper cups including the means set forth in claim 29, the means for revolving said bead forming member consisting of a pulley secured thereto for revolving the same, said bead forming member and pulley being laterally movable on the axis of the core, a hub on the pulley, and means adapted to engage the hub for laterally moving the bead forming member into engagement with the paper blank for forming the bead and out of engagement after the bead has been formed.

31. A machine for forming paper cups including means for cutting a plurality of adjacent paper cup blanks out of a sheet of paper, said blanks being transversely tapering but in reverse directions, a pair of tapering cup forming cores beside each other, means for feeding a pair of adjacent cup forming blanks simultaneously under said cores, and means for simultaneously folding the paper blanks around the cores and forming the cup thereon, whereby a plurality of paper cups would be simultaneously formed.

32. A machine for forming paper cups including means for cutting a pair of adjacent paper cup blanks out of a sheet of paper with their adjacent edges having narrow paper connections, a pair of tapering cores for forming paper cups located beside each other and tapering reversely of each other, a stationary plate under said cores having openings therein, a pair of mold members hinged to said plate under each of said cores and said members movable into and up out of the openings in said plate for folding the paper blanks around the cores simultaneously.

33. A machine for forming paper cups including a core for forming paper cups from paper blanks, means for oscillating said core from the cup forming position to the cup ejecting position, mold members hinged adjacent said core and adapted to fold the paper blank around the core for forming a cup, means for actuating the hinged mold members, movable fingers for engaging the paper blank and holding it in position against the core before and during the blank folding movement around the core, means for actuating said blank holding fingers, means for forming the bottom of the cup on the core, means for forming a bead on the cup, means for actuating said bead forming means, and a cam driven shaft having thereon a cam for actuating each of the foregoing means in the desired sequence and for the desired length of time, substantially as set forth.

In witness whereof I have hereunto affixed my signature.

PAUL R. SIMMONS.